Patented Nov. 22, 1932

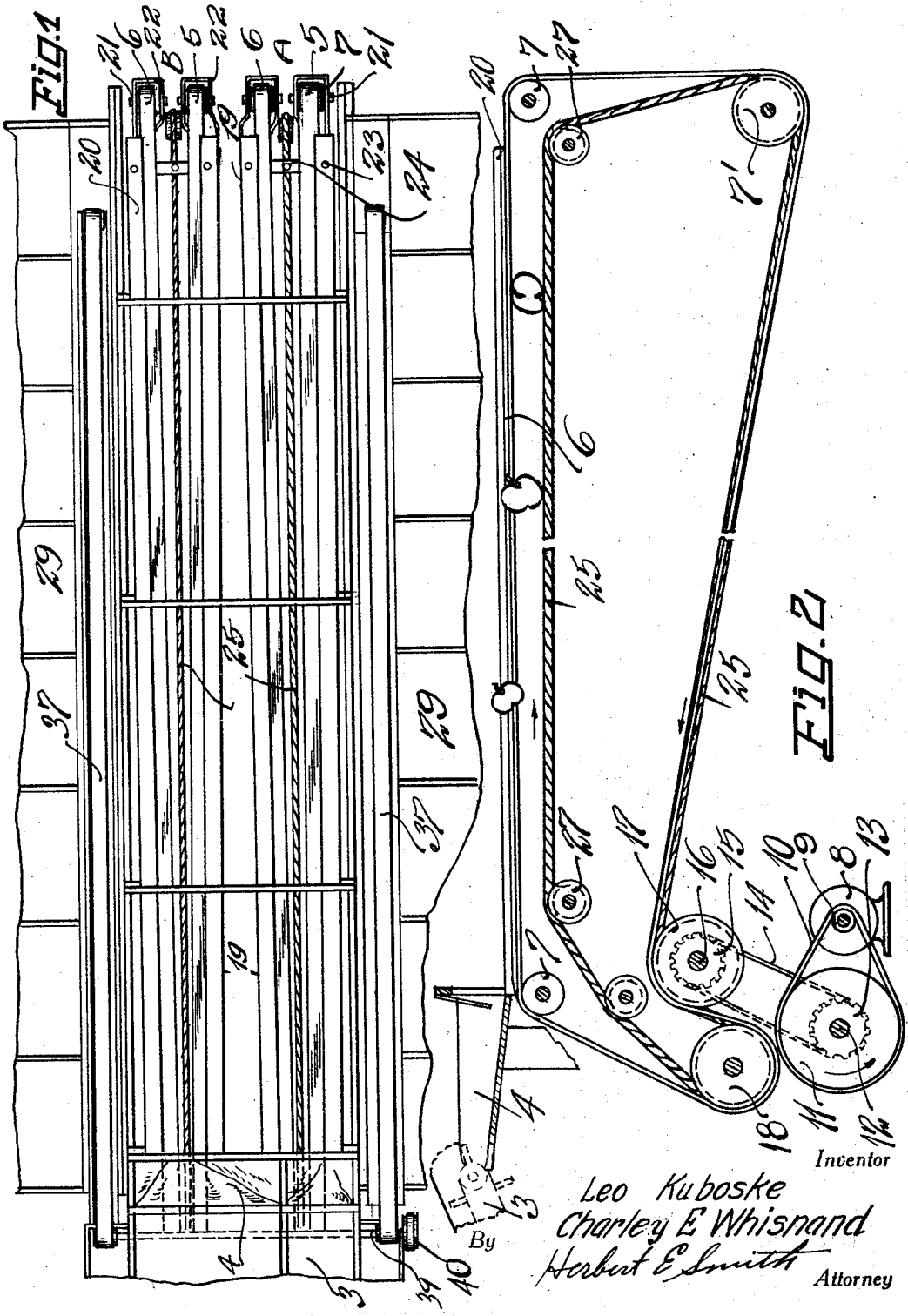

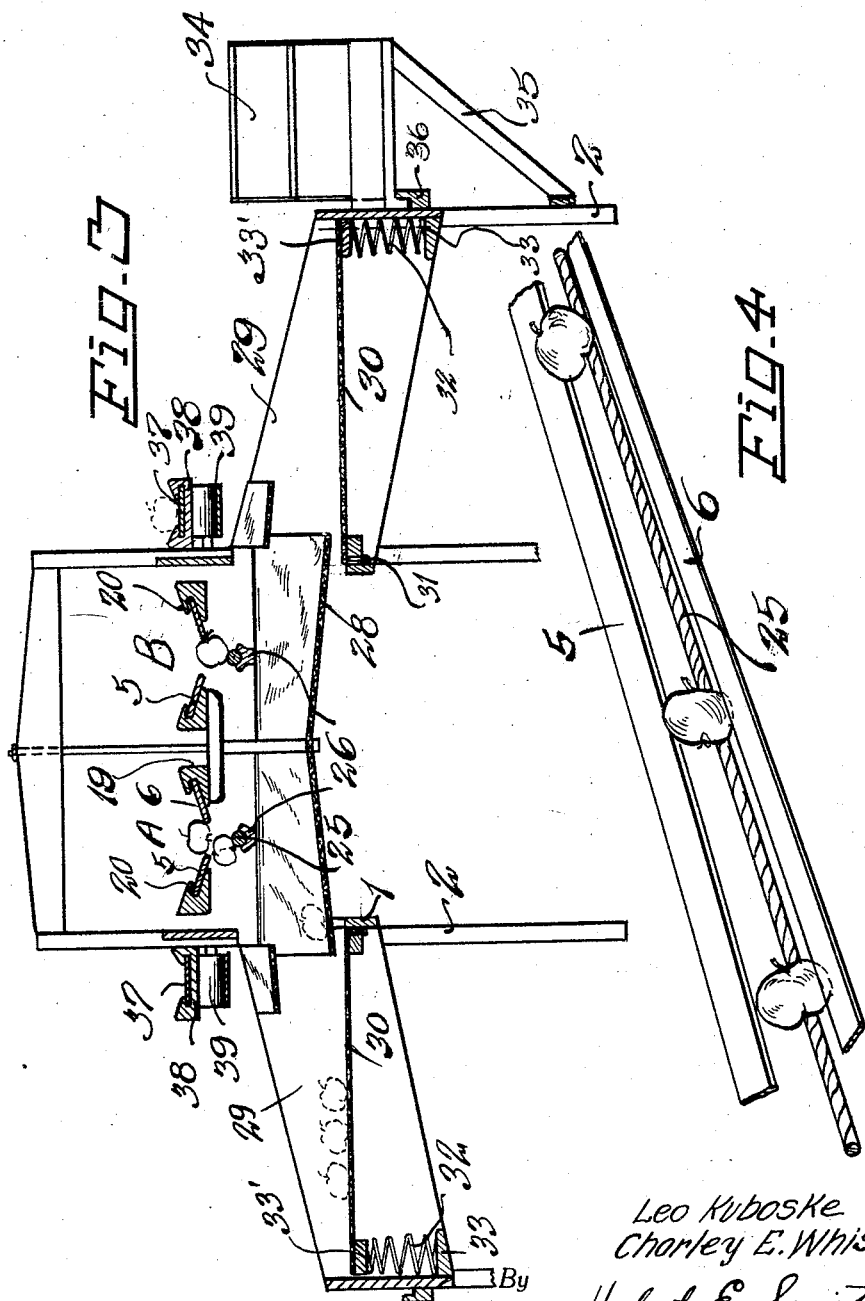

1,888,709

UNITED STATES PATENT OFFICE

CHARLEY E. WHISNAND AND LEO KUBOSKE, OF WENATCHEE, WASHINGTON, ASSIGNORS TO CATARACT FRUIT EQUIPMENT COMPANY, OF YAKIMA, WASHINGTON, A CORPORATION

FRUIT SIZING MACHINE

Application filed September 24, 1928, Serial No. 308,023. Renewed July 27, 1932.

Our present invention relates to improvements in fruit sizing machines, which while herein illustrated and described as adapted especially for sizing apples into different grades, are also capable for use with other kinds of fruits and vegetables. In carrying out our invention we use one or more units involving pairs of endless conveyers or belts in combination with an intermediate rope conveyer over which the apples and other fruits may be carried, and these conveyers are arranged to diverge toward their delivery ends, or from their receiving ends, in order that the smaller fruit may first be disposed of and then the larger fruit be disposed of at successive points along the length of the conveyers.

Means are provide for handling the separated apples, and means are also provided for disposing of the culls that are separated because of their condition. The invention consists in certain novel combinations and arrangements of parts as will hereinafter be more fully set forth and claimed. In the accompanying drawings we have illustrated one complete example of the physical embodiment of our invention wherein the parts are combined and arranged according to the best mode we have thus far devised for the practical application of the principles of our invention.

Figure 1 is a plan view of a machine embodying our invention, with parts broken away for convenience of illustration.

Figure 2 is a broken, longitudinal, vertical sectional view of one of the sizing units, showing also the operating means for the endless belts and intermediate rope conveyer.

Figure 3 is a transverse vertical section at line 3—3 Fig. 1.

Figure 4 is a perspective view showing parts of the conveyers of a unit.

The supporting structure, in the nature of a table or frame 1 having legs 2 is fashioned in suitable length and height and the apples are fed as from an elevator 3 to a feed hopper 4 at the receiving or left end of the machine in the drawings.

Any desired number of sizing units may be employed, two of the units being here designated as A and B in Figure 3, and each of these units includes a pair of endless belts as 5 and 6 made up of appropriate material for contact with the apples. The endless belts travel longitudinally of the machine and are supported on transversely disposed rolls 7, 7, properly situated at the opposite ends of the machine.

Power for operating the several conveyers is taken from an electric motor 8 through the belt drive including the small pulley 9 of the motor, belt 10, and large pulley 11 on the drive shaft 12 that is journaled in suitable bearings supported on the frame. A drive pinion 13 on the shaft 12 transmits power through the sprocket chain 14 to the driven sprocket wheel 15 on the driven shaft 16 as best seen in Figure 2, and the driven shaft has a wide roller 17 over which the endless belts pass; a large roller 18 also being employed with the complementary large end roller 7' for supporting the endless conveyers. The roller 17 is employed to impart the required movement to the several conveyers as indicated in Figure 2.

The upper or working flights of the pairs of belts 5 and 6 glide along over the top surfaces of guide rails 19, each of which has an outer guide flange 20 for the outer edge of each belt, and the shafts 21 of the guide rollers 7 are journaled in brackets 22 at the ends of these guide rails. Thus the rails with the rollers may be adjusted to diverge from the left to the right end, or from the receiving end to the delivery end of the conveyers as best seen in Figures 1 and 4. To hold the divergent ends of the belts in adjusted position we use bolts 23 passing through bolt holes in the rails and through transversely disposed bars 24, that have bolt holes adapted to register with those in the guide rails. The bolts may thus be passed through the holes to clamp the divergent ends of the rails in adjusted position on the cross bar, and of course the apples fall between the diverging conveyer belts 5 and 6, the smaller ones first, and the larger ones succeeding the smaller ones as the belts convey them from left to right as indicated.

Below the plane of the working flights of the belts 5 and 6, and located centrally of the longitudinally extending space between the belts an intermediate conveyer in the nature of a rope 25 is supported and designed to coact with the inner edges of the belts 5 and 6 in conveying the apples. This rope is also an endless conveyer, and its upper or working flight is maintained in horizontal position by means of guides 26 over which it travels.

The rope travels over guide pulleys 27 and follows the contour of the conveyer belts 5 and 6 as indicated in Figure 2, where it passes over the driving roller 17 to receive power therefrom, and the rope passes under guide rolls 7' and 18 with the conveyer belts. As seen in Figure 2 the right end of the working flight of the rope is lower than its left end so that the vertical space between the spaced belts 5 and 6 and the rope 25 increases toward the right or delivery end of the conveyers.

The belts and rope are of soft material that will not bruise the apples and the latter are conveyed by these members through the length of the sizing machine, the smaller apples being disposed of first and the larger ones later.

The apples fall through the diverging sizing conveyers into two longitudinally extending rows of chutes 28, one at each side of the longitudinal center of the machine, and these chutes decline into longitudinal rows of sizing bins 29, one row at each side of the machine.

The bins are provided with soft or cushioned, flexible, floating bottoms 30 upon which the apples of a specific size are rolled from the declining chute 28, the floating bottoms being provided with resilient means that maintain the level of the bins at such a height that there is no material "drop" of the apples from the chutes to the bins at any time, and bruising or marring of the apples is thus eliminated.

For this purpose the bottoms 30 are hinged at 31 along the inner side of the bins 29 and the outer free ends of the bottoms are resiliently supported by a spring or springs 32 interposed between a fixed spring bar 33 of the bin and a movable spring bar 33' of the bottom 30. Thus, as seen in Figure 3 the bottom, when the bin is empty, is resiliently supported in approximately horizontal position just below the outer edge of the declining chute 28. As the sized apples roll onto the movable bottom 30, the weight of the apples forces down the bottom against tension of spring 32 and the changing level of the accumulating apples is maintained at approximately horizontal position to receive apples from the chute.

The apples are taken by hand from the bins and placed in crates 34 that are conveniently supported on frames 35 detachably secured on hooks 36 of the bins. The culls are picked by hand from the conveyers and placed in one of two cull conveyer belts 37 that pass through troughs 38 at the opposite sides of the table, rollers 39 forming part of the drive for these cull belts and driven from the 40 operating mechanism in suitable manner.

Having thus fully described our invention, what we claim as new and desire to secure by Letters Patent is:—

1. The combination with a pair of guide rails and means for adjustably holding the rails in divergent position, of endless belts guided in said rails and guide rollers journaled on the rails for said belts, an intermediate, lower, diverging endless rope forming gaging slots with the belts, and driving mechanism for operating said belts and rope.

2. The combination with a pair of rails having guide flanges, endless belts guided in said rails, and guide rollers journalled on the rails for said belts, of a cross bar beneath the rails and provided with bolt holes, retaining bolts passed through said holes and also through holes in the rails to hold the latter in adjusted divergent position, and intermediate, lower, diverging endless rope forming gaging slots with the belts, and driving mechanism for operating said belts and rope.

In testimony whereof we affix our signatures.

CHARLEY E. WHISNAND.
LEO KUBOSKE.